United States Patent
Mortimer et al.

(10) Patent No.: US 7,938,909 B2
(45) Date of Patent: May 10, 2011

(54) AUTOMATED SANITATION

(75) Inventors: Alan Denton Mortimer, Henley-On-Thames (GB); Lee Underwood, Hazlemere (GB)

(73) Assignee: Veolia Water Solutions & Technoloiges Support, Saint Maurice (FR)

( * ) Notice: Subject to any disclaimer, the term of this patent is extended or adjusted under 35 U.S.C. 154(b) by 651 days.

(21) Appl. No.: 11/630,443

(22) PCT Filed: Aug. 8, 2005

(86) PCT No.: PCT/GB2005/003116
§ 371 (c)(1),
(2), (4) Date: Dec. 21, 2006

(87) PCT Pub. No.: WO2006/018606
PCT Pub. Date: Feb. 23, 2006

(65) Prior Publication Data
US 2008/0034846 A1    Feb. 14, 2008

(30) Foreign Application Priority Data
Aug. 14, 2004  (GB) .................................. 0418207.7

(51) Int. Cl.
*B08B 3/04* (2006.01)
*B08B 9/093* (2006.01)

(52) U.S. Cl. ............. 134/18; 134/22.11; 134/22.13; 134/22.14; 134/111; 134/113; 134/169 R; 134/169 C; 210/743; 210/746

(58) Field of Classification Search ............ 134/18, 134/22.1, 22.19, 42, 22.12, 22.13, 22.14, 134/111, 113, 169 R, 169 C; 210/743, 744, 210/746
See application file for complete search history.

(56) References Cited

U.S. PATENT DOCUMENTS

| 4,496,470 | A | * | 1/1985 | Kapiloff et al. ............... 510/162 |
| 5,057,229 | A | * | 10/1991 | Schulenburg et al. ......... 210/743 |
| 5,073,268 | A |   | 12/1991 | Saito |
| 5,282,889 | A | * | 2/1994 | Franklin ........................ 134/18 |
| 5,366,605 | A |   | 11/1994 | Wang |
| 6,129,099 | A | * | 10/2000 | Foster et al. .................. 134/57 R |
| 6,767,408 | B2 | * | 7/2004 | Kenowski et al. .............. 134/18 |
| 7,060,136 | B1 | * | 6/2006 | Zeiher et al. .................... 134/18 |
| 2003/0141258 | A1 |   | 7/2003 | Hatch |
| 2004/0112838 | A1 |   | 6/2004 | Martin |
| 2006/0241874 | A1 | * | 10/2006 | Carter ............................. 702/50 |

FOREIGN PATENT DOCUMENTS

| EP | 0 504 520 |   | 9/1992 |
| EP | 0504520 | * | 9/1992 |
| WO | WO02/38507 |   | 5/2002 |
| WO | WO2004/040389 |   | 5/2004 |

* cited by examiner

*Primary Examiner* — Michael Barr
*Assistant Examiner* — Saeed T Chaudhry
(74) *Attorney, Agent, or Firm* — Drinker Biddle & Reath LLP

(57) ABSTRACT

An automated method for determining the cleaning operation of a water treatment or water distribution apparatus or system to which one or more substances are added, the method comprising the steps of: (a) conducting one or more measurements of a property of the or an added substance; (b) comparing the property measurement s) from step (a) with at least one reference value for that property; and (c) determining when the comparison in step (b) is within, above or below a pre-determined range or level for that property. The determination in step (c) can consider whether the cleaning operation has been successfully carried out. The present invention automates and therefore optimizes the cleaning operation of the water treatment or distribution apparatus or system such that expensive periods of non-operation during sanitization or cleaning are minimized both in terms of frequency and duration.

27 Claims, 2 Drawing Sheets

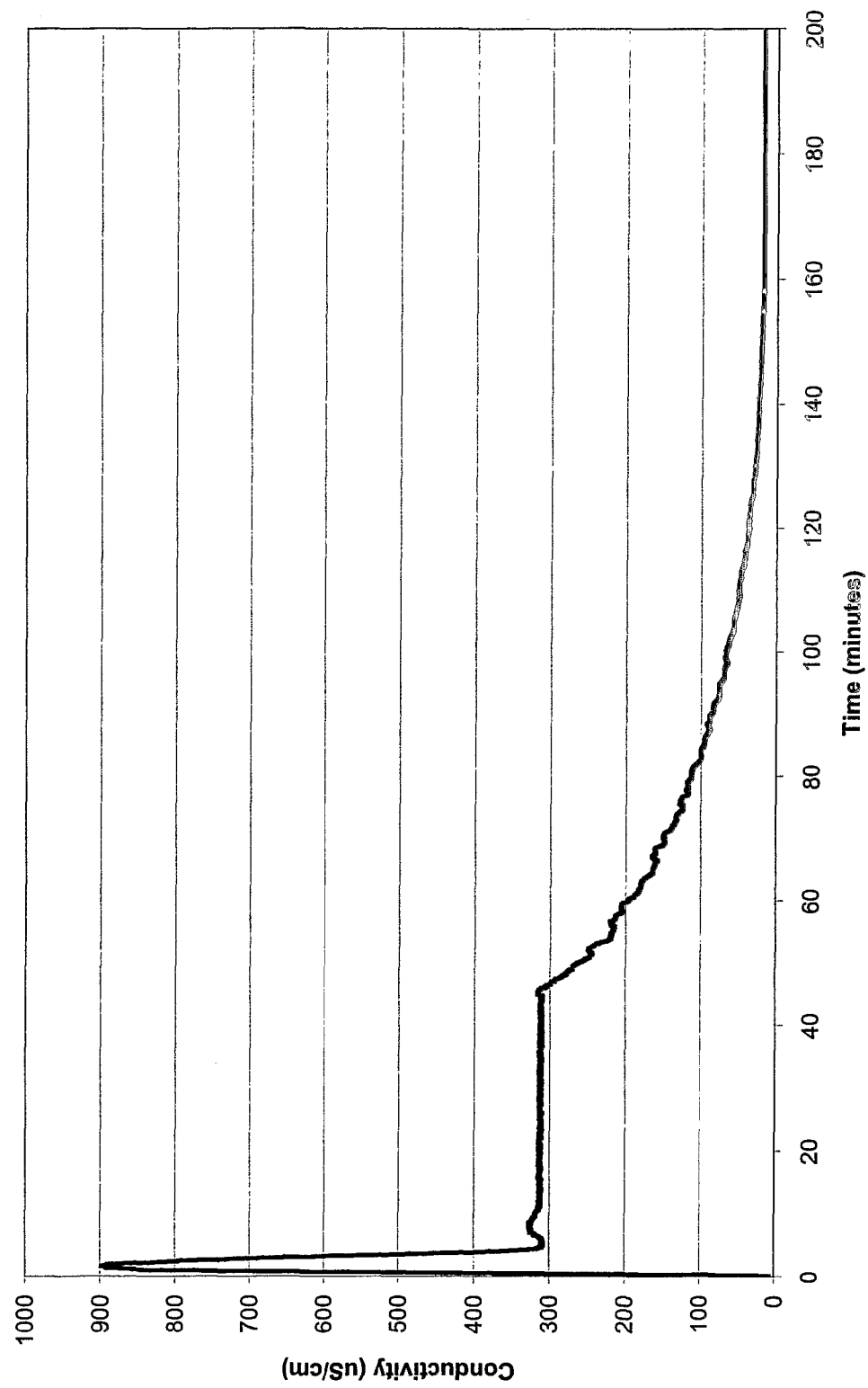

AUTOMATED SANITATION

FIELD OF THE INVENTION

The present invention relates to an automated method for verifying the cleaning of a water treatment or distribution apparatus, particularly but not exclusively sanitisation of such apparatus.

BACKGROUND

In the field of water treatment and distribution for applications such as laboratories, medical, clinical, research, manufacturing and others, it is important that the water treatment and distribution system is maintained either free from microbial contamination, or that the contamination is controlled to below a specified level.

One way of carrying this out is by thermal means. However, the high temperatures involved require the use of expensive components which have high fabrication and finishing costs, remembering also the high purity requirements. Many water treatment and distribution units, apparatus and other such type equipment can now be made from or use much less expensive plastic components. This greatly reduces cost, but means that thermal sansitisation cannot be used on all treatment devices, such that chemical sanitisation is used instead.

Cleaning of such apparatus and systems, in particular sanitisation, has traditionally been carried out manually, and whenever the system operator remembers. This can often be irregular or infrequent. Moreover, the addition of the potentially hazardous chemicals required for the cleaning also usually involves the coupling or attachment of temporary equipment, such as pumps or tanks, which may be 'unclean' or contain residual chemicals. The cleaning chemical(s) are generally re-circulated for a set period and then a rinse is carried out before the system is returned to normal usage.

Naturally, it is important that all the chemical or chemicals are removed prior to return to normal usage, as cleaning chemicals are generally damaging or otherwise dangerous to the activities that the water is being applied to.

The present method of determining when all the cleaning chemical has been removed, is to manually sample the rinse water every now and then. However this is not methodical and can be a slow or intermittent exercise.

Meanwhile, the current standard way of checking that a microbial sanitisation has been successfully carried out is by monitoring the bacterial loading of the water from the system only once it has been returned to use. However, this monitoring can take up to seven days whilst bacterial colonies are grown prior to counting. In the meantime, water which is believed to be pure is being circulated and used for their applications.

SUMMARY OF THE INVENTION

It is an object of the present invention to provide a method for overcoming these disadvantages.

Thus, according to one aspect of the present invention, there is provided an automated method for determining the cleaning operation of a water treatment or water distribution apparatus or system to which one or more substances are added, the method comprising the steps of:
(a) conducting one or more measurements of a property of the or an added substance;
(b) comparing the property measurement(s) from step (a) with at least one reference value for that property; and
(c) determining when the comparison in step (b) is within, above or below a pre-determined range or level for that property.

Once the determination in step (c) is carried out, it can be considered whether the cleaning operation has been successfully carried out.

The cleaning operation may be for a complete cleaning or sanitisation cycle for the apparatus or system. Alternatively, the cleaning operation may be a part of a cleaning or sanitisation cycle. In certain cleaning procedures or cycles, more than one substance may be used, usually sequentially. In other circumstances, the cleaning procedure or cycle may require the addition of a further amount or amounts of substance such as a cleaning chemical, either as part of the procedure or cycle, or because an insufficient amount of the substance was initially added, either unintentionally, or unexpectantly.

The present invention provides a method able to determine when each of the above circumstances has occurred, or is ready to occur, through measurement of a level of a substance in the apparatus or system. In one example, the method of invention can indicate if an insufficient amount of a cleaning chemical has been added, such that more could be added by the user.

The substance could be any suitable substance which has a property such as conductivity, pH, or ionic concentration, which is able to be measured by one or more measuring means, such as sensors. The substance may be the same as or additional to one or more cleaning agents. The substance may include one or more additives such as a tracer compound, adapted either to enhance the ability of a substance to provide or to generate a signal or property which is measurable, or to produce or generate a signal or measurement that is different than that of another chemical or substance that may be in the apparatus or system.

According to one embodiment of the present invention, the substance is the chemical agent suitable for cleaning the apparatus.

The comparison of step (b) may be conducted periodically, regularly or continuously.

The measuring of the property of the substance may be singular. When a plurality of measurements are conducted, they may be periodical, regular, or even continuous. Conducting a series of measurement, preferably over a time period, provides a form of monitoring the substance property.

Thus, according to a second aspect of the present invention, there is provided an automated process for monitoring the level of a substance in a cleaning operation acting on a water treatment or distribution apparatus, wherein at least one property of the substance is automatically measured by one or more measuring means, and the measured property is automatically compared with one or more reference values for that or each property.

The reference value or values are generally standard or pre-determined value or values which could be programmed into a suitable comparator, such as any computer or controller apparatus. Such reference value or values could be determined by prior experimentation with the apparatus or equipment, or other routine trial and error measurement operations.

The reference value or values may include or be a time element, or may be intended to be compared or determined over time. According to one embodiment of the present invention, a series of measurements of the property of the substance are conducted over time. In another embodiment, the invention requires a measurement value, or comparison determination, to occur or have occurred in or over a pre-determined time period, e.g. 30 minutes, before considering that that feature of the cleaning operation has been completed.

In one embodiment, steps (a) and (b), and optionally step (c), are carried out whilst the cleaning operation is occurring, optionally continuously.

The reference value or values may be the same or different over time. The pre-determined range or level for step (c) may also be the same or different over time.

The water treatment or distribution apparatus may include a reservoir of water. It may also include a ringmain around which or through which water is pumped, and is available for take off at one or more ports for use in relevant applications.

Water treatment apparatus as defined in the present application includes any apparatus designed to in some way treat water, particularly but not exclusively to purify water, usually by the extraction and/or exchange of one or more substances in the water. Such substances may or may not be deemed impurities, and their removal and/or exchange may or may not improve the quality of the water with regard to known water treatment or purification processes. Such apparatus may include one or more treatment and/or purification units or operations such as provided by filters, membranes and ultra-violet light.

A water treatment system as defined in the present invention is a system involving a water treatment apparatus, usually but not exclusively in combination with one or more other apparatus, units or equipment, which may be integral or separate therewith.

The present invention provides an automated method for monitoring a sanitisation or cleaning operation whilst it is occurring, and can also confirm that the sanitisation of the cleaning operation has been carried out satisfactorily, if, for instance, the determination in step (c) is that the level of substance in the apparatus is within a pre-determined value, values or range.

The present invention also provides an automated method for determining that all the chemical or chemicals used for the cleaning operation have been removed, obviating the need for repeated manual sampling and analysis. It is of course still possible for an operator to carry out a final confirmation acceptance test on the water before the water apparatus or system is returned to use, but, significantly, repeated analyses are not required.

Indeed, the shutting down of a water apparatus or system can have cost implications on the application the apparatus or system is being used for, such as interrupting manufacturing. Naturally therefore, it is important that the length of any shutdown of the water system or apparatus is minimised. The time for any such shutdown may be the result of failing to meet the required specification, or the amount of time taken for the sanitisation or cleaning procedure to be confirmed. In particular, the present invention provides a method for monitoring which gives a high degree of confidence that the water system or apparatus is suitable for reuse in the relevant applications without the need for an extended period of shutdown whilst bacteriological samples are analysed.

The present invention is automated in comparison with previous manual sampling and consideration of rinse water after a cleaning operation, thus in particular avoiding the requirement for operator involvement or intervention. This provides several significant advantages. Firstly, it can be ensured that the water treatment or water distribution apparatus or system is properly cleaned before re-use, avoiding any inappropriate or accidental operator reliance. Secondly, the present invention can be adapted to providing information other than just whether the cleaning operation has been concluded. Thirdly, the present invention can provide a profile of the cleaning operation, especially where steps (a) and (b) are carried out regularly and/or continuously, which profile can be used by the apparatus or system in further operations or for comparison with other cleaning operations, and/or by the operator, user, manufacturer or a regulatory body, to ensure correct use of the apparatus or system.

The present invention further provides the ability to measure the property or properties of one or more substances, such as sanitising or cleaning chemicals, that may be being used simultaneously in the apparatus or system.

The reference value or values are preferably stored in the memory of a programmable unit. If the property measurement, such as a sensor profile, does not match that recorded in the memory, then a warning can be given that the sanitisation has not proceeded satisfactorily, and, depending on the comparison obtained, various warnings may be given, for example that at lower strength of chemical has been used or that no chemical has been added at all. Aural and/or visible alarms can be raised at any stage of the sanitisation if it is appropriate to do so.

It is another feature of the present invention that it can be combined with the use of a security device such as a code, a pass key or the like, to help prevent unauthorised operation of the water apparatus or system routines. This also improves verification of correct cleaning procedures of the system or apparatus or system.

The pre-determined range required for step (c) could be a comparison figure such as 5 or 10% difference between the measured property of the substance and the reference value for that property. The substance may be added to the apparatus or system through a transfer port.

In a preferred embodiment, the transfer port is also flushed with the water so that no residual substance or chemical is left within the system. The port should also be devoid of stagnant areas which could harbour or encourage the growth of microorganisms.

In another embodiment of the present invention, the measured property, such as a sanitisation profile, could be stored and used for future comparisons. The storage means may be any suitable electronic unit or device, and such storage means may be intergral or separate from the water treatment or water distribution apparatus or system. The comparison may be as an additional check or as part of the main verification process as a record of historical events. This may be particularly useful for review by third parties such as regulatory bodies or authorities, to provide an (independent) verification of the proper use of the equipment by the user. Such verifications can take place at the requirement of national or regional pharmacopoeia or by other independent monitoring authorities to confirm that the water treatment apparatus or water distribution apparatus or system is being properly used and cleaned, such that the water from the apparatus or system is compliant with relevant local regulations or water quality levels.

According to a third aspect of the present invention, there is provided apparatus to automatically monitor a sanitisation or cleaning of a water treatment or water distribution apparatus or system, which apparatus is adapted to generate a profile which is used to determine if sanitisation or cleaning has been carried out.

BRIEF DESCRIPTION OF THE DRAWING

An embodiment of the present invention will now be described by way of example only, and with reference to the accompanying drawings in which:

FIG. 2 is a graph of the conductivity during sanitation.

DETAILED DESCRIPTION OF THE PREFERRED EMBODIMENTS

Figure 1:
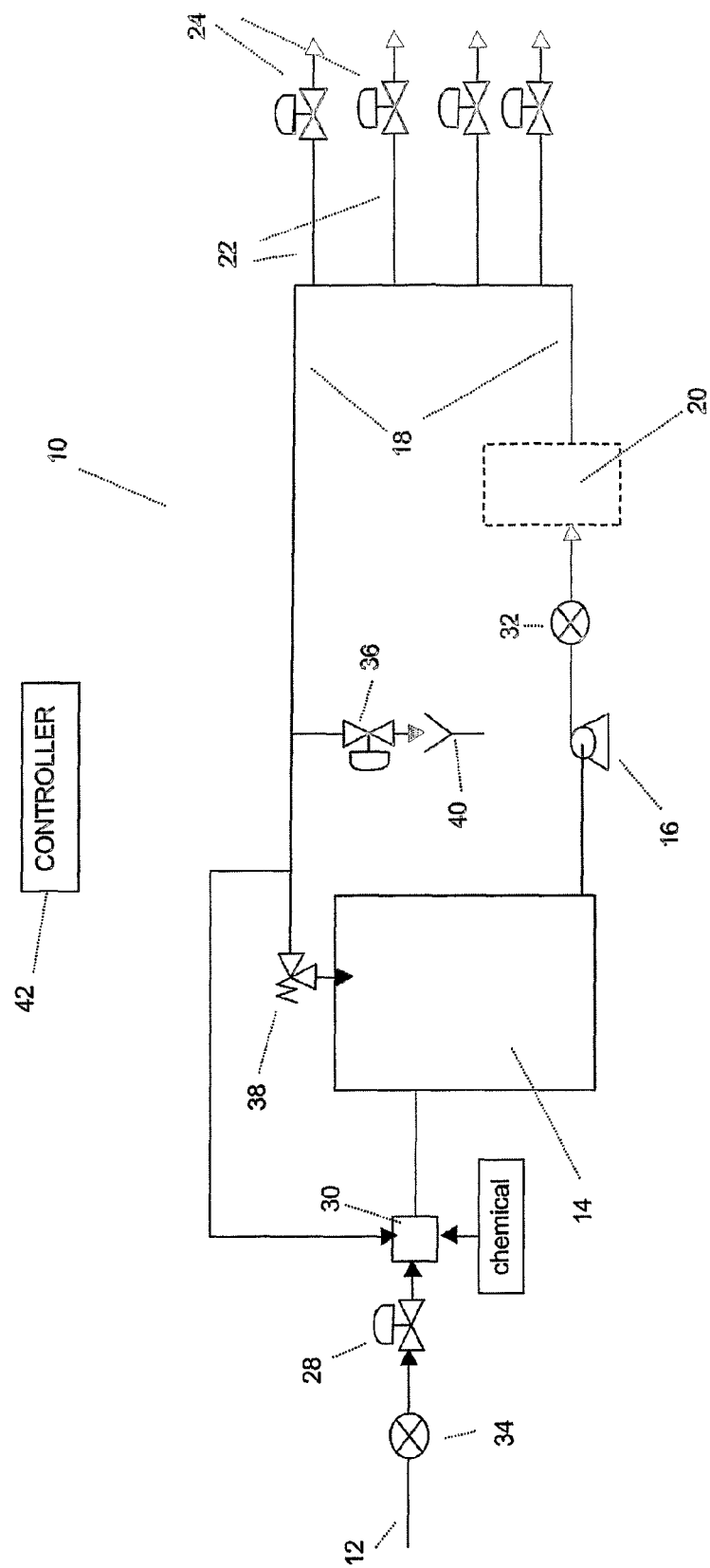
FIG. 1 is a schematic representation of the invention.

Referring to the drawing, FIG. 1 shows a water distribution system 10, which delivers water from the inlet 12. The water is recirculated from a reservoir 14 by a recirculation pump 16 around a ringmain 18. The ringmain 18 may contain water purification equipment 20 such as ion exchange resins, ultra-filters or ultra violet tubes, before being taken off by users at a number of points 22. Excess water to that required by users is returned to the reservoir 14. A pressure sustaining valve 38 maintains pressure in the system 10.

To carry out a sanitisation operation, a code is required by the system 10 which may be input into the controller 44 by known mechanical, keypad or coded key means. This initiates the sanitation mode. During the sanitisation procedure the take off points 22 can be prevented from use by take off valves 24 being held closed.

The amount of water in the reservoir 14 is lowered to a pre-determined level by opening the drain valve 36. When this is reached, valve 36 is closed and the system awaits the chemical substance to be placed into the chemical transfer port 30. Addition of the chemical may be prompted by a display and confirmation provided by the operator via a user interface such as a button or coded key.

Once confirmation is received the re-circulation pump 16 is re-started and the chemical is flushed from the chemical transfer port 30 into the reservoir 14. Alternatively, the chemical may be flushed using feedwater 12.

The chemical is then recirculated around the ringmain 18 for a pre-determined period. During this time a property of the diluted chemical such as conductivity or pH is measured via sensor 32. A profile against time is recorded by the controller 42 and this is compared with reference profiles stored in the memory of the controller. This comparison may be via peak values, integration, the value being within boundaries for a specific time period or by any other mathematical means. Alteration of the recirculation period may occur depending on the value measured by the sensor.

In certain cleaning procedures, further chemical additions may be required or desired, either of the same chemical or a different chemical substance, to provide further or additional cleaning as is known in the art.

Once the measured property of the chemical substance and the reference profile are within a pre-determined range, or have been within the range for a predetermined period, this step of the procedure is deemed completed, and the procedure moves to the next stage.

When the period of recirculation is completed drain valve 36 is opened and feedwater 12 is allowed to flow into the system through feed valve 28.

If desired, another sensor 34 in the feed line measures the same property of the chemical substance as measured by sensor 32 and comparison of the two values by the controller 42 takes place for the rinsing out operation also. As the system is rinsed the values increasingly equalise and once this has been achieved to acceptable limits, plus potentially an extra time period if required, the controller 42 advises the user to test that all the chemical is out of the system and once confirmed, that the system can be returned to operation.

If the profile from the sensor recorded by the controller 42 does not match that stored, then the operator is informed and the operator can then investigate the failure and carry out a repeat sanitisation or cleaning operation, cycle, or procedure as required.

EXAMPLE

FIG. 2 is a sanitisation profile as recorded by apparatus based on that shown in FIG. 1, containing a water purification system with a 350 liter reservoir, a recirculation pump and a ringmain. In-line conductivity sensors as known in the art were installed in the feedwater to the reservoir and in the ringmain. The sensors provided a signal to a control board containing an enhanced FLASH microcontroller.

The amount of water in the reservoir was lowered to 40 liters and a sanitisation solution of 0.9 litre of 22% hydrogen peroxide and 4.5% peroxyacetic acid was added to the chemical transfer port. The solution was allowed to recirculate for a period of 45 minutes.

The controller recorded the conductivity profile of the solution being recirculated as shown in FIG. 2. The controller was able to compare the peak conductivity as the sanitant enters the recirculation loop (900 µS/cm) with limits set in its memory. This initial peak may also be integrated to provide an amount added. It was then able to compare a section of the conductivity profile with profile pre-set values or limits, for example a minimum of 250 µS/cm and a maximum of 400 µS/cm between times $t=15$ mins and $t=45$ mins to determine that the sanitisation continues to proceed correctly.

The displacement rinse procedure was then activated and the unit controller continued to monitor the conductivity of the recirculating solution until such time that the recirculation conductivity matched that of the feedwater to within pre-set limits.

The present invention, along with good operating practice of carrying out sanitisations and cleans when routine monitoring indicates that action is required, optimises the operation of the water treatment or distribution system such that expensive periods of non-operation during sanitisation or cleaning are minimised both in terms of frequency and duration.

The invention claimed is:

1. An automated method for determining the sanitisation cycle of a water treatment or water distribution apparatus or system containing water purification equipment, to which one or more substances are added and later removed, the automated method comprising the steps of:
    (a) initiating a sanitisation mode;
    (b) adding a substance to water in the apparatus during the sanitization mode and circulating a mixture of water and substance through a circulation loop in the apparatus or system;
    (c) conducting one or more measurements of the conductivity of the substance during the sanitization mode utilizing a first sensor mounted within the circulation loop;
    (d) comparing the conductivity measurement(s) from step (c) with at least one reference value for that property;
    (e) determining when the comparison in step (d) is within, above or below a pre-determined range or level for the conductivity;
    (f) initiating an action depending on whether the determination in step (e) is within, above or below a pre-determined range or level for the conductivity;
    (g) adding water to and removing water from the apparatus or system to reduce the amount of substance in the water within the apparatus or system;
    (i) sensing the conductivity of a feed water stream from outside the circulation loop using a second sensor mounted outside the circulation loop; and
    (j) returning the apparatus or system to use after the amount of substance in the water has been reduced below or value based on a comparison of the sensed conductivities from the first and second sensors.

2. A method as claimed in claim 1 wherein the sanitization mode is a complete sanitisation cycle for the apparatus or system.

3. A method as claimed in claim 1 wherein the sanitization mode is a part of a sanitisation cycle for the apparatus or system.

4. A method as claimed in claim 1 wherein one substance is a cleaning chemical.

5. A method as claimed in claim 1 wherein two or more substances are added, each substance being a cleaning chemical, and optionally the substances being added sequentially.

6. A method as claimed in claim 1 adapted to determine whether the quantity of one or more of the substance(s) added is within, above or below a pre-determined quantity.

7. A method as claimed in claim 1 wherein one or more of the substances includes one or more additives adapted either to enhance the ability of a substance to provide or generate a conductivity which is measurable, or to provide or generate a measurable conductivity that is different from that of another substance in the apparatus or system.

8. A method as claimed in claim 1 wherein a series of measurements is conducted.

9. A method as claimed in claim 8 wherein the measurements are conducted periodically, regularly or continuously.

10. A method as claimed in claim 8 wherein the measurements are conducted over a time period to monitor a substance conductivity.

11. A method as claimed in claim 1 wherein the comparison of step (d) is conducted periodically, regularly or continuously.

12. A method as claimed in claim 1 wherein the reference value or values are standard or pre-determined value or values.

13. A method as claimed in claim 12 wherein the reference value or values are programmed into a comparator.

14. A method as claimed in claim 1 wherein the reference value or values are determined by use of the apparatus or system.

15. A method as claimed in claim 1 wherein the comparison in step (d) with the reference value or values includes a time element.

16. A method as claimed in claim 1 wherein the comparison in step (d) with the reference value or values is compared or determined over a time period.

17. A method as claimed in claim 1 wherein steps (c), (d) (e) and (f) are carried out whilst the sanitisation cycle is occurring.

18. A method as claimed in claim 17 wherein the steps are carried out continuously.

19. A method as claimed in claim 1 wherein the determination in step (e) includes a comparison in step (d) to occur in a pre-determined time period for completion of the cleaning operation.

20. A method as claimed in claim 1 wherein the reference value or values are the same or different over time.

21. A method as claimed in claim 1 wherein the pre-determined range or level for step (e) is the same or different over time.

22. A method as claimed in claim 1 wherein the water treatment or water distribution apparatus or system includes a reservoir of water.

23. A method as claimed in claim 1 wherein the method is able to determine that all the substance or substances used for the cleaning operation have been removed from the apparatus or system.

24. A method as claimed in claim 1 wherein the step of initiating an action in step (f) involves providing an alarm if the property measurement does not compare with a reference value in the determination in step (e).

25. A method as claimed in claim 1 wherein the method step of initiating the sanitization mode involves use of a security unit, device or apparatus.

26. A method as claimed in claim 25 wherein the security unit, device or apparatus is a code or pass key and the step involves providing the code or pass key to the apparatus or system.

27. An apparatus to automatically monitor a sanitisation cycle of a water treatment or water distribution apparatus or system the apparatus comprising a housing including a circulation loop, a reservoir for holding a substance to be added to the circulation loop, and a dispenser for dispensing water from the circulation loop, a computer processor mounted within the housing and programmed to perform a method as defined in claim 1 to generate a profile to determine whether sanitisation or cleaning has been carried out; and a first sensor mounted within the circulation loop for conducting the measurement of the conductivity of the mixture of water and the added substance in step (c); and a second sensor mounted within the housing on a feed water pipe which supplies water to the circulation loop, the second sensor sensing, the conductivity of the water prior to entering the circulation loop.

* * * * *